(12) United States Patent
Foster et al.

(10) Patent No.: US 6,923,346 B2
(45) Date of Patent: Aug. 2, 2005

(54) FOAMING LIQUID DISPENSER

(75) Inventors: Donald D. Foster, St. Charles, MO (US); Philip L. Nelson, Wildwood, MO (US)

(73) Assignee: Continental AFA Dispensing Company, St. Peters, MO (US)

(*) Notice: Subject to any disclaimer, the term of this patent is extended or adjusted under 35 U.S.C. 154(b) by 196 days.

(21) Appl. No.: 10/426,230

(22) Filed: Apr. 30, 2003

(65) Prior Publication Data

US 2004/0084481 A1 May 6, 2004

Related U.S. Application Data

(63) Continuation-in-part of application No. 10/288,831, filed on Nov. 6, 2002, now Pat. No. 6,644,516.

(51) Int. Cl.$^7$ .............................................. B67D 5/058
(52) U.S. Cl. .................. 222/190; 222/145.5; 222/321.7
(58) Field of Search .............................. 222/190, 321.9, 222/145.5, 321.7

(56) References Cited

U.S. PATENT DOCUMENTS

| | | |
|---|---|---|
| 3,359,917 A | 12/1967 | Cooprider |
| 4,219,159 A | 8/1980 | Wesner |
| 4,277,001 A | 7/1981 | Nozawa |
| 4,349,131 A | 9/1982 | Arabian |
| 4,402,432 A | 9/1983 | Corsette |
| 4,438,871 A | 3/1984 | Eckert |
| 4,516,727 A | 5/1985 | Saito et al. |
| 4,850,517 A | 7/1989 | Ter Stege |
| 4,932,567 A | 6/1990 | Tanabe et al. |
| 5,071,379 A | 12/1991 | Poizot |
| 5,271,530 A | 12/1993 | Uehira et al. |
| 5,337,929 A | 8/1994 | Van der Heijden |
| 5,351,862 A | 10/1994 | Weag |
| 5,429,279 A | 7/1995 | Van der Heijden |
| 5,443,569 A | 8/1995 | Uehira et al. |
| 5,458,289 A | * 10/1995 | Cater ........................ 239/119 |
| 5,570,819 A | 11/1996 | Uehira et al. |
| 5,715,973 A | 2/1998 | Foster et al. |
| 5,732,855 A | 3/1998 | Van der Heijden |
| 5,752,626 A | 5/1998 | Bachand |
| 5,775,547 A | 7/1998 | Foster et al. |
| 5,779,104 A | 7/1998 | Reidel |
| 5,794,821 A | 8/1998 | Foster et al. |
| 5,813,576 A | 9/1998 | Iizuka et al. |
| 5,918,771 A | 7/1999 | Van der Heijden |
| 5,927,561 A | 7/1999 | Foster et al. |
| 6,053,364 A | 4/2000 | Van der Heijden |
| 6,053,368 A | 4/2000 | Geimer |
| 6,082,588 A | 7/2000 | Markey et al. |
| 6,119,899 A | 9/2000 | Iizuka et al. |
| 6,206,303 B1 | 3/2001 | Shinozaki et al. |

(Continued)

FOREIGN PATENT DOCUMENTS

| | | |
|---|---|---|
| EP | 1 190 775 A1 | 3/2002 |
| JP | 07-061876 | 9/1996 |
| JP | 07-098108 | 10/1996 |
| JP | 07-274462 | 5/1997 |
| JP | 07-274463 | 5/1997 |
| JP | 07-281046 | 5/1997 |

Primary Examiner—Michael Mar
Assistant Examiner—Melvin Cartagena
(74) Attorney, Agent, or Firm—Thompson Coburn, LLP

(57) ABSTRACT

A manually operated liquid foaming dispenser is attached to the top of a container of liquid and is manually vertically reciprocated to dispense the liquid from the container as a foam. The dispenser includes a liquid pump chamber and an air pump chamber that respectively pump liquid and air to a discharge passage of the pump where the liquid and air are mixed, generating the foam dispensed from the dispenser. The liquid dispenser is constructed with three biased closed valves that prevent leakage from a liquid container attached to the dispenser should the dispenser and container be positioned on their sides or be inverted.

20 Claims, 10 Drawing Sheets

U.S. PATENT DOCUMENTS

| | | |
|---|---|---|
| 6,220,483 B1 | 4/2001 | Van der Heijden |
| 6,299,028 B1 | 10/2001 | Iizuka et al. |
| 6,302,304 B1 | 10/2001 | Spencer |
| D452,822 S | 1/2002 | Boshuizen et al. |
| D456,260 S | 4/2002 | Boshuizen et al. |
| 6,446,840 B2 | 9/2002 | Ophardt et al. |
| 2002/0056730 A1 | 5/2002 | Van de Heijden |
| 2002/0070238 A1 | 6/2002 | Pritchett et al. |

* cited by examiner

FOAMING LIQUID DISPENSER

CROSS-REFERENCE TO RELATED APPLICATIONS

This application is a continuation-in-part of application Ser. No. 10/288,831, which was filed on Nov. 6, 2002 now U.S. Pat. No. 6,644,516.

BACKGROUND OF THE INVENTION

1. Field of the Invention

The present invention pertains to a manually operated liquid foaming dispenser. Specifically, the invention pertains to a manually operated pump that is attached to the top of a bottle of liquid and is manually vertically reciprocated to dispense the liquid from the container as a foam. The pump includes a liquid pump chamber and an air pump chamber that respectively pump liquid and air under pressure to a discharge passage of the pump where the liquid and air are mixed, generating the foam dispensed from the pump.

2. Field of the Invention

Manually operated liquid dispensers that dispense liquid as a foam are known in the prior art. The most well known of these types of dispensers are manually operated trigger sprayers that pump liquid from a bottle container attached to the trigger sprayer and dispense the liquid as a foam that is discharged from the trigger sprayer. The dispensing nozzle of this type of trigger sprayer typically discharges the liquid as a spray toward an obstruction that is vented to the atmosphere. The spray hitting the obstruction mixes the liquid spray with the air of the atmosphere producing the foam that is discharged from the trigger sprayer.

The typical trigger sprayer that discharges a foam is constructed of a sprayer housing containing a pump chamber, a liquid supply passage, and a liquid discharge passage. The liquid supply passage communicates the pump chamber with the liquid contained in the container attached to the trigger sprayer. A pump piston is mounted in the pump chamber for reciprocating movement between charge and discharge positions. A trigger is attached to the sprayer housing and is connected to the pump piston for moving the pump piston. The pump chamber also communicates with the liquid discharge passage which extends from the pump chamber to the discharge nozzle of the trigger sprayer.

A first check valve assembly is positioned between the pump chamber and the liquid supply passage. The first check valve allows liquid to travel through a dip tube and the liquid supply passage into the pump chamber when the pump piston is moved to the charge position, and prevents the reverse flow of liquid from the pump chamber when the pump piston is moved to the discharge position. A second check valve is usually positioned in the discharge passage between the pump chamber and the discharge nozzle. The additional check valve assembly allows the flow of liquid from the pump chamber through the discharge passage to the discharge nozzle when the pump piston is moved to the discharge position, but prevents the reverse flow of liquid and/or air when the pump piston is moved to the charge position.

The basic construction of the foaming liquid trigger sprayer described above is well suited for dispensing liquids where the desired foaming of the liquid is marginal, for example in dispensing foaming liquid kitchen cleaners or bathroom cleaners. However, the foaming trigger sprayers cannot produce a more dense foam such as that of shaving cream.

To produce a more dense foam such as that of shaving cream from a liquid dispenser requires that both the liquid and air being mixed by the dispenser be under pressure. This requires that the manually operated foaming dispenser include both a liquid pump chamber and an air pump chamber. The addition of the air pump chamber to the manually operated dispenser increases the number of component parts of the dispenser. The air pump chamber must also have an air pump piston that moves between the charge and discharge positions in the air pump chamber to draw air into the chamber and force air under pressure from the chamber. In addition, the air pump chamber must also have a check valve assembly that allows the air of the exterior environment of the dispenser to flow into the air pump chamber when the air pump piston is moved to the charge position and prevents the flow of air from the air pump chamber to the exterior environment when the air pump piston is moved to the discharge position. A second check valve assembly is also needed to control the flow of pressurized air from the air pump chamber to the discharge passage when the air pump piston is moved to the discharge position, and to prevent the reverse flow of air from the discharge passage to the air pump chamber when the air pump piston is moved to the charge position. These additional component parts required by this type of liquid foaming dispenser significantly increase manufacturing costs.

SUMMARY OF THE INVENTION

The liquid foaming dispenser of the invention overcomes disadvantages of prior art foaming dispensers having both a liquid pump chamber and an air pump chamber by reducing the number of component parts required by the air pump chamber. The liquid foaming dispenser is basically comprised of a pump housing comprising the liquid pump chamber at the bottom of the housing and a coaxial air pump chamber above the liquid pump chamber. The air pump chamber is open at its top. A container cap is provided at the top of the pump housing. A dip tube extends downwardly from the liquid pump chamber at the bottom of the pump housing. With the container cap attached to a container of liquid, the dip tube extends downwardly into the liquid.

A pump plunger is assembled into the pump housing from the top of the housing. The pump plunger has a liquid pump piston at its bottom that is inserted through the pump housing into the liquid pump chamber. A spring is positioned between the bottom of the liquid pump chamber and the liquid pump piston. An air pump piston is also provided on the pump plunger just above the liquid pump piston. The air pump piston is positioned in the air pump chamber with the liquid pump piston positioned in the liquid pump chamber. A dispenser head is provided at the top of the pump plunger. A liquid discharge passage extends through the center of the pump plunger from the liquid pump piston to the dispenser head. A liquid mixer or screen is positioned in the liquid discharge passage in the dispenser head.

In addition, three check valves are positioned along the length of the liquid discharge passage in the pump plunger. One check valve controls the flow of liquid into the liquid pump chamber and prevents the reverse flow. The second check valve controls the flow of liquid from the liquid pump chamber to the discharge passage and prevents the reverse flow. The third check valve controls the flow of air from the air pump chamber to the discharge passage and prevents the reverse flow.

The third check valve that controls the flow of air out of the pump chamber into the discharge passage and prevents the reverse flow of air from the discharge passage into the pump chamber is a resilient tube valve. The tube valve engages against the interior surface of the liquid discharge passage. Valve openings in the pump plunger communicate the exterior surface of the tube valve with the interior of the air pump chamber. The novel construction of the tube valve permits the flow of air under pressure from the air pump chamber to the discharge passage and prevents the reverse flow of air from the discharge passage to the air pump chamber. The tube valve is the only valve that controls the flow of air into and out of the air pump chamber, eliminating the additional valve present in prior art foaming dispensers that mix liquid and air under pressure.

The air pump chamber of the invention has a cylindrical interior surface with a first, upper section and a second, lower section. The interior diameter of the air pump chamber first section is slightly larger than that of the air pump chamber second section. In addition, the air pump piston exterior surface has a first section and a second section. The exterior diameter of the second section of the exterior surface is larger than the exterior diameter of the first section of the exterior surface. The exterior diameter of the second section of the air pump piston exterior surface is also larger than the interior diameter of the second section of the air pump chamber interior surface, but is smaller than the interior diameter of the first section of the air pump chamber interior surface. Thus, when the pump plunger is manually depressed downwardly moving the liquid pump piston and the air pump piston toward their discharge positions in their respective liquid pump chamber and air pump chamber, the second exterior surface section of the air pump piston will engage in sealing contact with the second section of the air pump chamber interior surface, pressurizing the air in the air pump chamber. The pressurized air eventually opens the tube valve and is discharged into the liquid passage where it mixes with the liquid being discharged from the liquid pump chamber. On the reverse direction of the pump plunger where the liquid pump piston and air pump piston are moved toward their charge positions, the second section of the air pump piston exterior surface still engages with the second section of the air pump piston interior surface for a portion of the pump plunger movement to produce a vacuum in the air pump chamber. However, when the air pump piston reaches its charge position, the second section of the air pump piston exterior surface is positioned inside the first section of the air pump chamber interior surface where it disengages from the air pump chamber interior surface. This allows the vacuum produced in the air pump chamber to draw in air from the exterior environment of the dispenser into the air pump chamber. This venting of air into the air pump chamber is accomplished without the need for an additional check valve.

Thus, the liquid foaming dispenser of the invention provides the mixing of the liquid and air under pressure in the liquid discharge passage to produce the desired foam. However, the construction of the dispenser eliminates a valve assembly from the air pump chamber that is required in prior art foaming liquid dispensers of this type. The reduced number of component parts of the dispenser of the invention allows it to be manufactured more economically, overcoming the disadvantages associated with prior art liquid foaming dispensers of this type.

BRIEF DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

The liquid foaming dispenser 10 of the present invention is similar to the types of dispensers known in the art as lotion dispensers. These types of dispensers are typically operated by orienting the dispenser vertically upright. In the description of the liquid foaming dispenser of the invention to follow, the terms "top" and "bottom", "upper" and "lower" or similar related terms will be used to describe the component parts of the dispenser. These terms are only used because the dispenser is typically oriented vertically upright when using the dispenser. The terms should not be interpreted as limiting.

Figure 1:
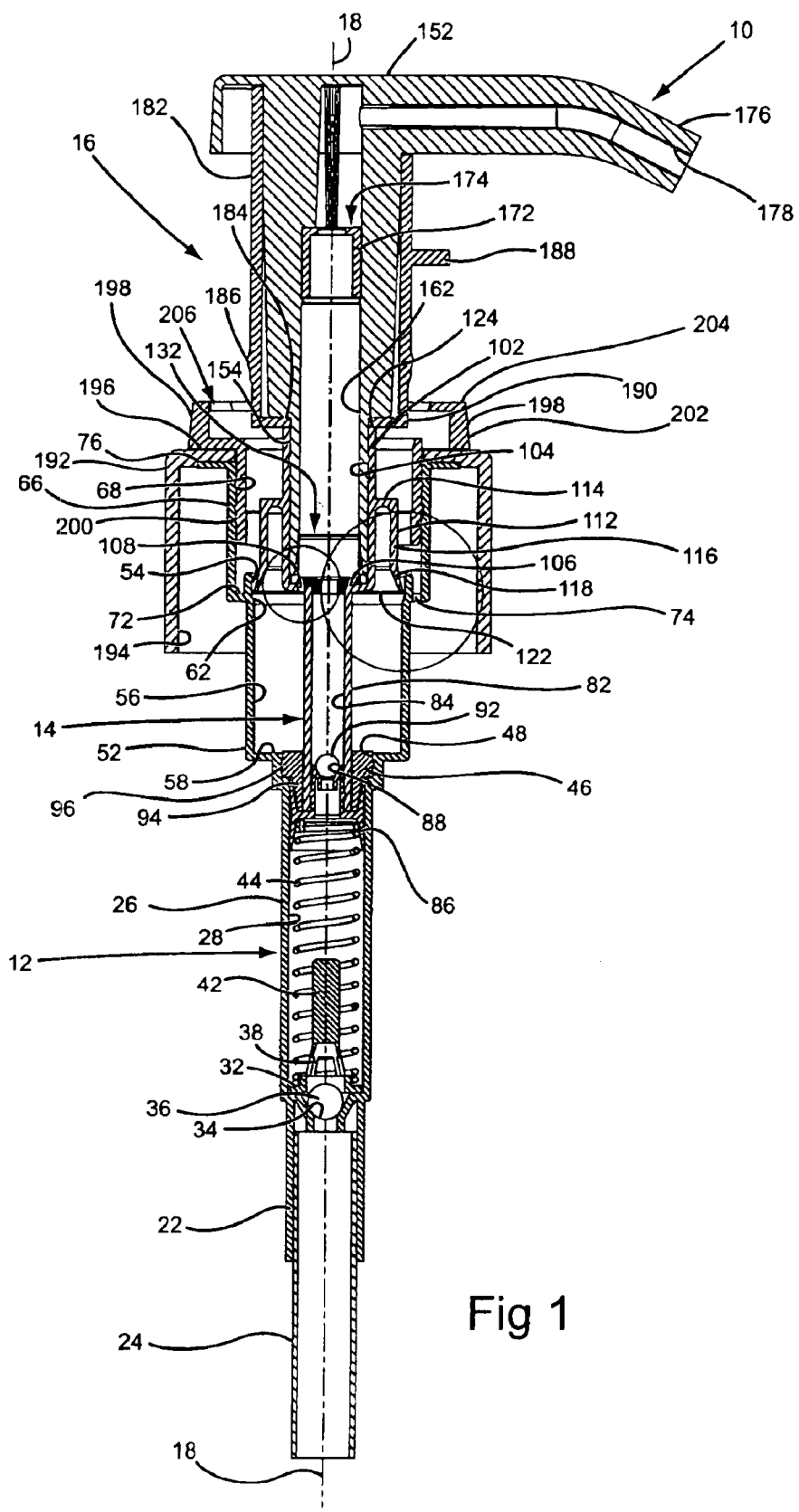
FIG. 1 is a cross-section elevation view of the liquid foaming dispenser of the invention in its charge position.
Figure 2:
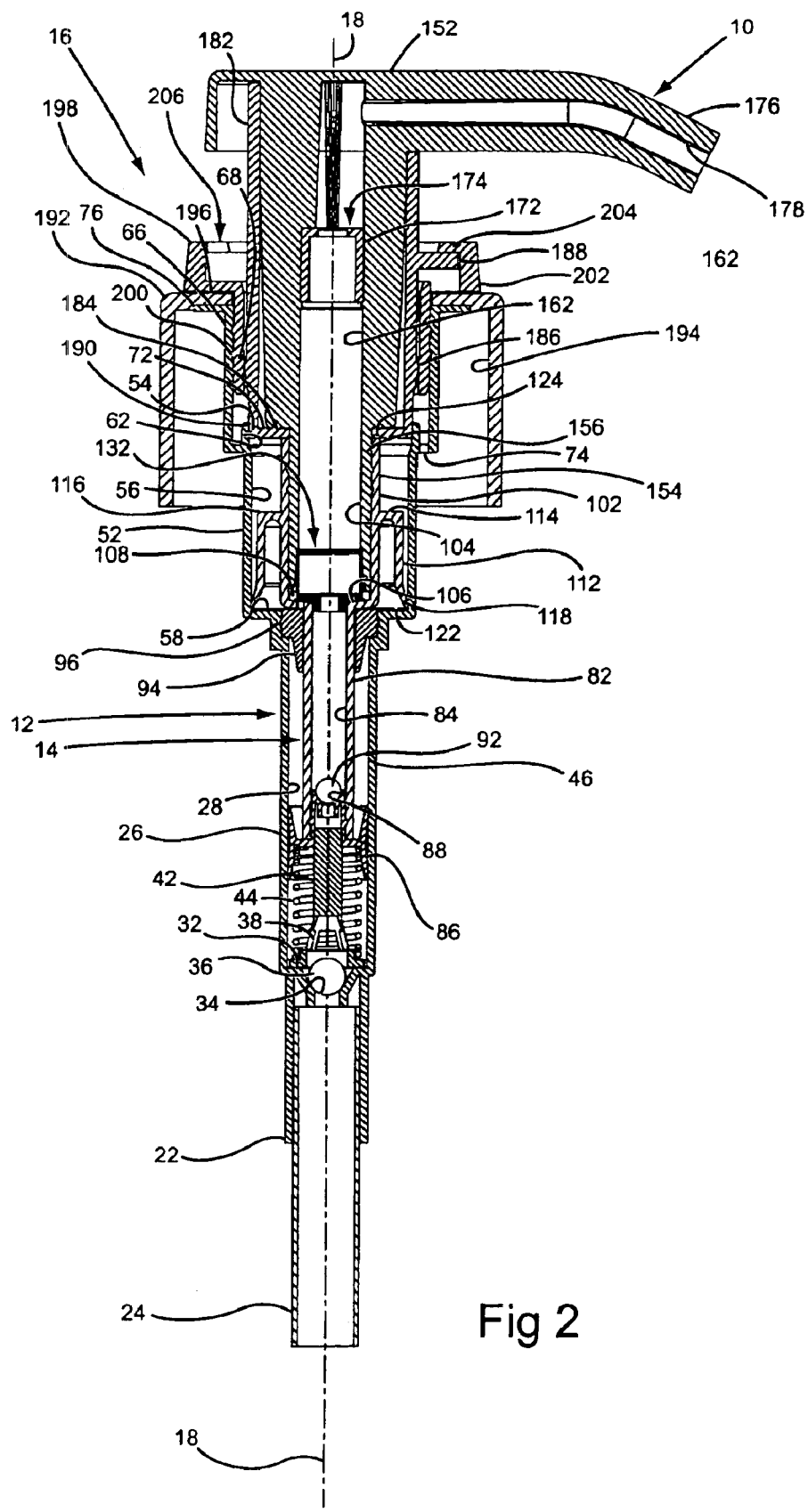
FIG. 2 is a cross-section elevation view of the liquid foaming dispenser in its discharge position, as well as in its locked and sealed position.

The liquid foaming dispenser 10 shown in FIGS. 1 and 2 is basically comprised of a pump housing 12, a pump plunger 14 and a container cap and lock assembly 16. The materials employed in constructing the component parts of the dispenser are the same as those typically used in the industry, usually plastics except for a metal coil spring employed in the pump. Apart from the construction of a dispenser head and a locking assembly of the dispenser which will be later described, the liquid foaming dispenser 10 of the invention is symmetric about a center axis 18 that extends downwardly through the dispenser and defines mutually perpendicular axial and radial directions.

The pump housing 12 is basically constructed with four cylindrical sections. At the bottom of the pump housing 12 is a bottom tubular section 22 that receives a dip tube 24. The dip tube 24 is inserted into the liquid container (not shown) with which the liquid foaming dispenser 10 is used. Just above this bottom section 22 is the cylindrical liquid pump chamber 26.

The liquid pump chamber 26 has a cylindrical interior surface 28 that extends between a first, top end of the liquid pump chamber and a second, bottom end of the liquid pump chamber. The bottom end of the liquid pump chamber has a circular bottom wall 32. Recessed into the center of the bottom wall 32 is a generally cone-shaped valve seat 34. The valve seat 34 has a conical seat surface that receives a ball valve 36. The ball valve 36 unseats from the seat surface of the valve seat 34 to permit liquid flow into the liquid pump chamber 26, and seats on the seating surface of the valve seat 34 as shown in FIG. 1 to prevent liquid flow from the pump chamber 26 to the dip tube 24. Just above the ball valve 36 is a ball valve cage 38 that confines the ball valve 36 to the area above the valve seat 34. A liquid pump chamber sealing stopper 42 projects upwardly from the ball valve cage 38. A metal coil spring 44 is positioned in the liquid pump chamber 26 and engages against the ball valve cage 38 holding the cage in its position shown in FIG. 1. At the top end of the liquid pump chamber 26, the chamber expands radially outwardly forming an annular interior surface 46 at the top of the chamber and an adjacent cylindrical interior surface 48 at the top of the chamber. The liquid pump chamber 26 then opens into the air pump chamber 52.

The air pump chamber 52 has a length with a top, first end and an opposite bottom, second end. A cylindrical interior surface comprised of a first interior surface section 54 and a second interior surface section 56 extends between the top and bottom ends. The first interior surface section 54 is above the second interior surface section 56 and has a slightly larger interior diameter than the second interior surface section 56. At the bottom of the second interior surface section 56, the air pump chamber has an annular bottom wall 58 with an opening at its center that communicates with the liquid pump chamber 26. As the second interior surface section 56 extends upwardly toward the top end of the air pump chamber, it meets with a tapered interior surface section 62 that merges into the first interior surface section 58. The top, first end of the air pump chamber 52 at the top of the first interior surface section 54 is open to the exterior environment of the dispenser 10.

The pump housing 12 also comprises a container cap and lock support cylinder 66. The cap and lock support cylinder 66 extends upwardly from the exterior of the air pump chamber 52 adjacent the top end of the air pump chamber. The cap and lock support cylinder 66 has a cylindrical side wall with a cylindrical interior surface 68. The cap and lock support cylinder 66 also has an annular end wall 72 at the bottom, second end of the cylinder that attaches the cylinder to the exterior of the air pump chamber 52. A vent hole 74 is provided through the annular wall 72 that vents the interior of a liquid container (not shown) to which the dispenser 10 is attached to the exterior environment of the dispenser. An annular flange 76 projects radially outwardly from the top, first end of the cap and lock support cylinder 68.

The pump plunger 14 is basically comprised of a piston assembly and a dispenser head assembly. The piston assembly comprises a liquid pump piston rod 82 at the bottom of the assembly. The liquid pump piston rod 82 is tubular and has a cylindrical interior surface 84 that extends through its entire length and defines a portion of the liquid discharge passage of the pump plunger 14. A liquid pump piston 86 is provided at the bottom of the liquid pump piston rod 82.

The liquid pump piston 86 engages in sliding, sealing engagement with the liquid pump chamber interior surface 28. A tubular valve seat 88 that is integral with the liquid pump piston 86 extends upwardly into the interior of the liquid pump piston rod 82. The tubular valve seat 88 has a generally conical interior seating surface and a ball valve 92 rests on this surface. The tubular valve seat 88 defines a portion of the liquid discharge passage through the liquid pump piston rod 82 when the ball valve 92 is unseated from the interior surface of the valve seat. The tubular valve seat 88 also functions in securing the liquid pump piston 86 to the bottom of the liquid pump piston rod 82. The engagement of the metal coil spring 44 against the liquid pump piston 86 also holds the liquid pump piston to the liquid pump piston rod 82. In addition, the interior bore of the tubular valve seat 88 where it merges with the liquid pump piston 86 has an interior diameter dimension that receives the liquid pump chamber sealing stopper 42 in sealing engagement when the pump plunger 14 is in its discharge and lock position relative to the pump housing 12 which will be explained.

An annular sealing and locking collar 94 is mounted on the exterior surface of the liquid pump piston rod 82 in a sealing, sliding engagement. An exterior surface 96 of the collar 94 is pressed into the liquid pump chamber cylindrical interior surface 48 at the top of the liquid pump chamber securing the collar in place and sealing the liquid pump chamber 26 from the air pump chamber 52.

Figure 3:
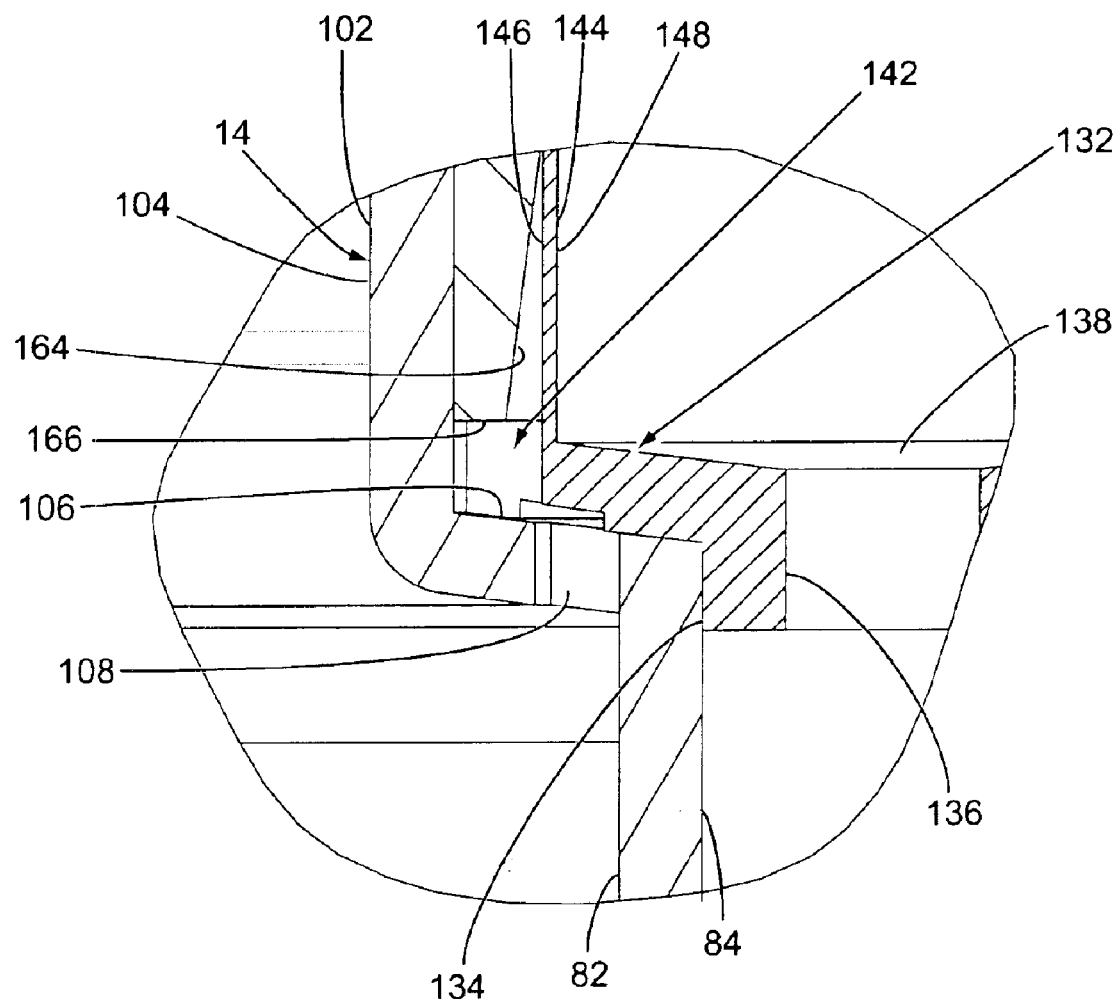
FIG. 3 is a partial enlarged view of the details of the dispenser shown in the area circled to the left in FIG. 1.

The top, first end of the liquid pump piston rod 82 merges into the bottom, second end of the air pump piston rod 102. The air pump piston rod 102 has a cylindrical interior surface 104 that extends between the top, first end of the air pump piston rod to the bottom, second end of the air pump piston rod and defines a portion of the liquid discharge passage through the pump plunger. An annular bottom wall 106 joins the air pump piston rod 102 to the liquid pump piston rod 82. A pair of diametrically opposed valve openings 108, only one of which is seen in FIGS. 1, 2 and 3, extend through the annular bottom wall 106.

An air pump piston 112 is connected to the exterior of the air pump piston rod 102 by an annular wall 114 that extends radially outwardly from the air pump piston rod 102 to a top, first end of the air pump piston 112. The air pump piston 112 has a cylindrical exterior surface with a first surface section 116 and a second surface section 118. As the air pump piston exterior surface extends downwardly from the first exterior surface section 116 adjacent the top of the air pump piston, to the second exterior surface section 118 adjacent the bottom, second end of the air pump piston, the exterior surface of the second exterior surface section 118 expands radially outwardly. The second exterior surface section 118 expands to the largest exterior diameter dimension of the air pump piston 112 at the bottom end 122 of the piston. The exterior diameter of the air pump piston exterior surface at the bottom end 122 is smaller than the interior diameter of the air pump chamber first interior surface section 54, but larger than the interior diameter of the air pump chamber second interior surface section 56. This dimensioning of the air pump piston provides a sliding, sealing engagement between the air pump piston bottom, second end 122 and the air pump chamber second interior surface section 56. From the air pump piston 112, the air pump piston rod 102 extends upwardly to an open top, first end 124 of the rod.

Figure 4:
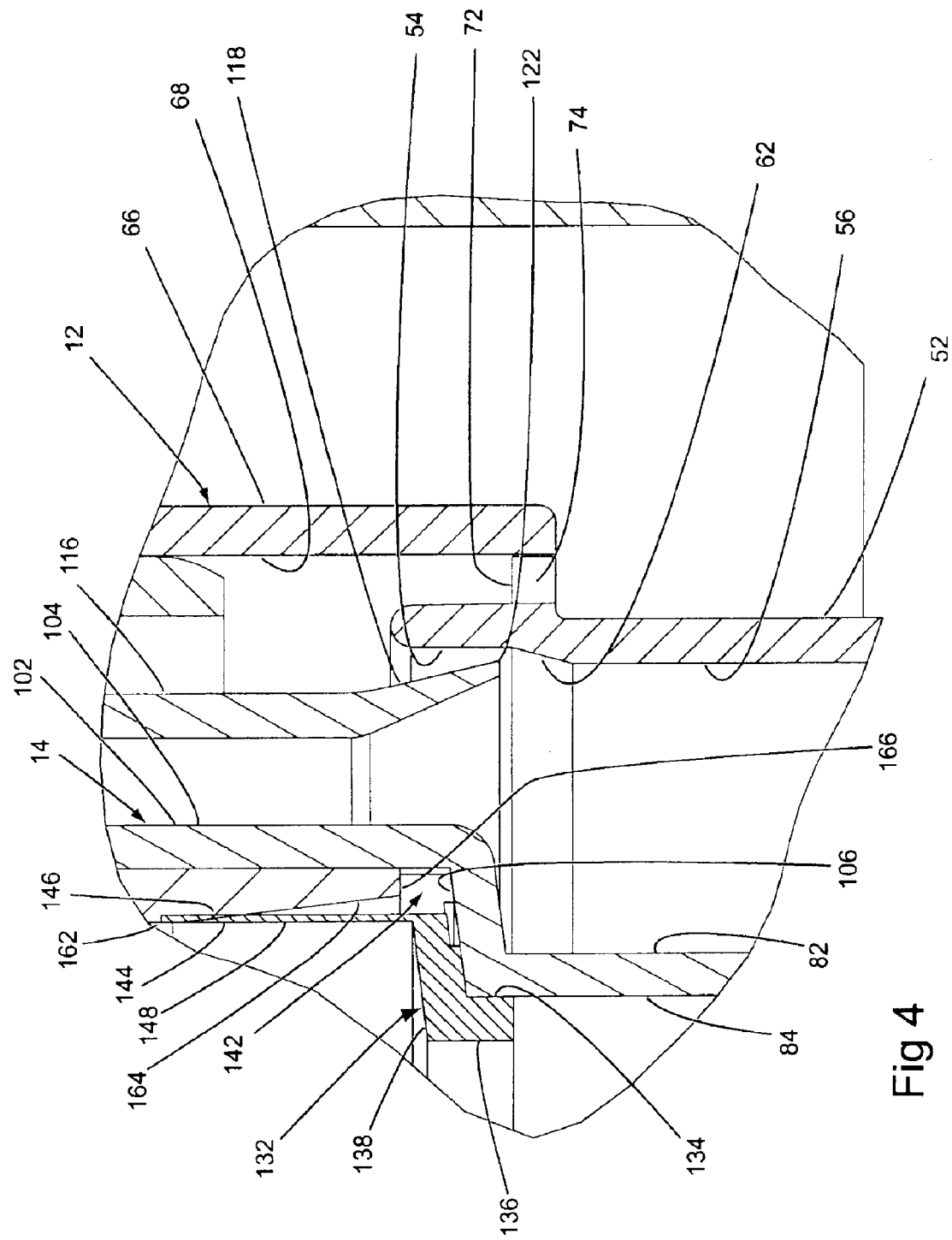
FIG. 4 is an enlarged partial view of the details of the dispenser shown circled to the right in FIG. 1.
Figure 5:
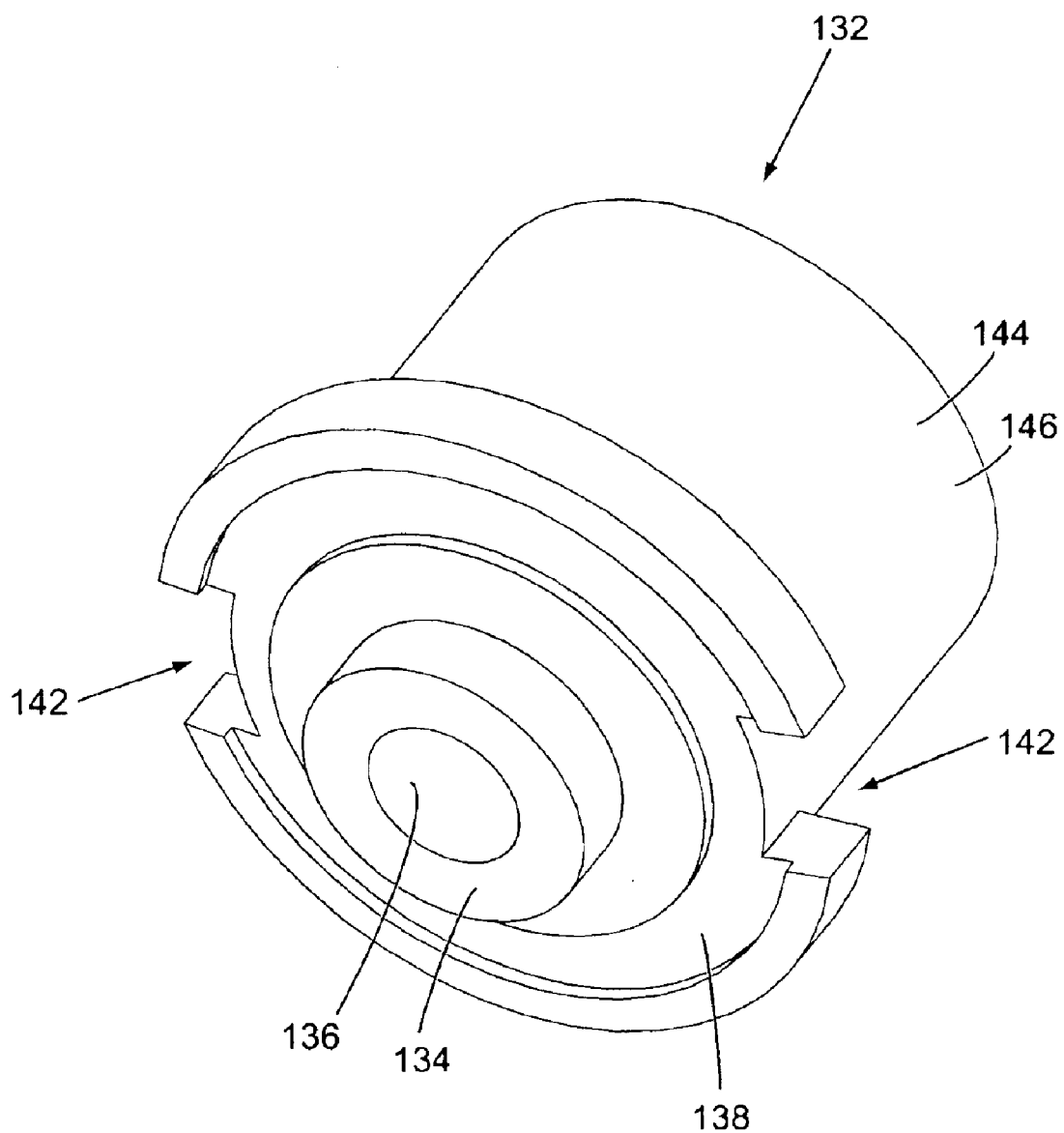
FIG. 5 is an enlarged perspective view of the tubular check valve of the dispenser disassembled from the dispenser.

A tubular check valve 132 is assembled into the portion of the liquid discharge passage of the pump plunger 14 defined by the interior surface 104 of the air pump piston rod 102. As best seen in FIGS. 3 and 4, the tubular check valve 132 has a cylindrical bottom portion 134 with a center bore 136. The cylindrical bottom portion 134 is inserted into the top end of the liquid pump piston rod 82, securing the tubular check valve 132 to the liquid pump piston rod. An annular bottom wall 138 extends radially outwardly from the cylindrical bottom portion 134 of the valve and engages with the interior surface 104 of the air pump piston rod 102. The center bore 136 also extends through the bottom wall 138. A pair of diametrically opposed notches 142 are formed in the annular bottom wall 138 in positions that coincide with the valve openings 108 through the annular bottom wall 106 of the air pump piston rod 102. A resilient tubular sleeve 144 extends upwardly from the annular bottom wall 138 of the valve. The sleeve 144 is positioned radially inside the pair of notches 142. The sleeve has a cylindrical exterior surface 146 and an opposite cylindrical interior surface 148 that surrounds a center bore of the sleeve that defines a portion of the liquid discharge passage of the pump plunger.

The dispenser head assembly of the pump plunger 14 includes a dispenser head 152 that has a bottom tubular portion 154 that is inserted into the air pump piston rod 102 at the top end of the rod. The tubular portion 154 has an exterior surface 158 that engages against the interior surface 104 of the air pump piston rod 102, securing the dispenser head to the rod. The dispenser head 152 has a cylindrical interior surface 162 that defines a portion of the liquid discharge passage of the pump plunger 14. A lower portion of the dispenser head interior surface 164 tapers radially outwardly as it extends to the bottom end 166 of the dispenser head as shown in FIGS. 3 and 4. This provides a small spacing between the dispenser head interior surface 164 at the bottom of the dispenser head and the exterior surface 146 of the resilient sleeve 144 of the tubular check valve 132.

A fluid disrupter 172 is positioned in the dispenser head in engagement with the interior surface 162 of the dispenser head. The fluid disrupter 172 has a small opening 174 that is screened or is provided with intersecting spokes that traverse the opening. The screened or spoked opening 174 of the fluid disrupter, as well as the interior of the disrupter, form a portion of the liquid discharge passage extending through the dispenser head 152.

The top of the dispenser head is provided with a spout 176 that extends to one side of the head. The spout 176 has an interior surface 178 that defines a portion of the liquid discharge passage extending through the dispenser head.

A sealing and locking sleeve 182 is mounted on the exterior surface of the dispenser head 152. The sleeve 182 is held in place by a bottom annular wall 184 of the sleeve that is positioned between the dispenser head 152 and the air pump piston rod 102. The sleeve 182 has an annular rim 186 that projects radially outwardly a small distance from the sleeve exterior surface. The bottom end of the sleeve 190 functions as a sealing stopper and has an exterior diameter dimension that is slightly larger than the interior diameter dimension of the air pump chamber first interior surface section 154. In addition, a lock tab 188 projects radially outwardly from the sleeve exterior surface.

The container cap and lock assembly includes a cylindrical container cap 192 that is mounted on top of the annular flange 76 of the cap and lock support cylinder 66 of the pump housing. Although not shown, the interior surface 194 of the container cap 192 would be provided with screw threading or bayonet connectors complementary to connectors of the liquid container with which the liquid foaming dispenser 10 is used. An inwardly projecting annular wall 196 at the top of the cylindrical cap 192 supports the cap on top of the annular flange 76 of the cap and lock support cylinder 66. A lock collar 198 secures the container cap 192 to the pump housing 12. The lock collar 198 has a lower cylindrical portion 200 with an exterior surface that engages against the interior surface of the cap and lock support cylinder 66, securely holding the container cap 192 between the lock collar 198 and the cap and lock support cylinder 66. An upper portion 202 of the lock collar has a radially inwardly projecting lock flange 204 that circles around the dispenser head 152. The lock collar flange 204 has an opening 206 that is dimensioned to receive the lock tab 188 on the dispensing head. The interior surface 208 of the lower cylindrical portion 200 has an interior diameter dimension that is slightly smaller than the exterior diameter dimension of the sealing and locking sleeve annular rim 186.

In operation of the liquid foaming dispenser with the dispenser attached to a liquid container (not shown) and the dip tube 24 extending into the liquid of the container, the pump plunger 14 is first positioned in the charge position relative to the pump housing 12 shown in FIG. 1. The term "charge" is used herein to indicate the condition where the liquid pump chamber 26 and air pump chamber 52 have been charged or filled with liquid and air respectively. However, on initial pumping of the liquid foaming dispenser 10, in the position shown in FIG. 1, the liquid pump chamber 26 and the air pump chamber 52 have not yet been primed and would be filled with air. The air pump piston bottom end 122, being spaced from the first interior surface section 54 of the air pump chamber 52, vents the air pump chamber to the exterior atmosphere of the dispenser.

The pump plunger 14 is then moved downwardly relative to the pump housing 12 toward the discharge positions of the pump pistons relative to the pump housing. The term "discharge" is used herein to indicate that the pistons are expelling the fluids contained in their respective pump chambers under pressure. With the liquid pump chamber ball valve 36 seated, downward movement of the liquid pump piston 86 compresses the air in the liquid pump chamber causing the piston ball valve 92 to unseat and the air in the liquid pump chamber to be discharged through the liquid discharge passage of the pump plunger. The downward movement also compresses the spring 44 in the liquid pump chamber 26. In addition, the downward movement of the air pump piston 112 through the air pump chamber 52 causes the bottom end 122 of the piston to engage in sealing contact with the second interior surface section 56 of the air pump chamber, pressurizing the air in the air pump chamber. The pressurized air is transmitted through the valve openings 108 to the exterior surface 146 of the tubular check valve resilient sleeve 144, causing at least a portion of the sleeve to be displaced radially inwardly from its sealing contact with the bottom portion 164 of the dispenser head interior surface. This causes the air under pressure in the air pump chamber 52 to be discharged through the liquid discharge passage of the dispenser head 52.

Subsequent upward movement of the pump plunger 14 relative to the pump housing 12 by the compressed spring 44 causes the liquid pump piston upper ball valve 92 to seat preventing air from entering the liquid pump chamber from the dispenser head and creating a vacuum in the liquid pump chamber 26. This vacuum causes the liquid pump chamber lower ball valve 36 to unseat and draws liquid upward through the dip tube 24 and into the liquid pump chamber 26. The upward movement of the air pump piston 112 in the air pump chamber 52 also creates a vacuum in the air pump chamber. The exterior surface 146 of the tube valve sleeve 144 engages against the interior surface 164 of the dispenser head and prevents air from entering the air pump chamber 52 from the liquid discharge passage. The upward movement of the air pump piston 112 continues until the air pump piston 112 reaches the first interior surface section 54 of the air pump chamber where the bottom end 122 of the air pump piston disengages from the interior surface. This vents the air pump chamber 52 to the exterior environment of the liquid foaming dispenser causing air to enter into the air pump chamber 52.

Subsequent downward movement of the pump plunger 14 into the pump housing 12 pressurizes the contents of the air pump chamber 52. The liquid contained in the liquid pump chamber 26 seats the lower ball valve 36 and displaces the upper ball valve 92 causing the liquid to move upwardly through the liquid discharge passage of the dispenser. The air under pressure in the air pump chamber 52 again causes the resilient sleeve 144 of the tubular check valve 132 to be displaced radially inwardly causing the air to move upward through the vent openings 108 past the sleeve 144 and into the liquid in the liquid discharge passage. Both the air and the liquid pass through the disrupter opening 174 of the fluid disrupter 172 in the liquid passage of the dispenser head 152 creating a foam that is dispensed from the dispenser head 152.

The dispenser can also be locked in the discharge position to prevent leakage of any of the liquid contents of the liquid container through the dispenser should the container and dispenser be positioned on their side. With the pump plunger 14 moved downwardly to its discharge position, the liquid pump chamber sealing stopper 420 engages in the interior bore of the liquid pump piston 86 just below the tubular valve seat 88. This seals the liquid pump chamber 26 from the liquid discharge passage extending through the liquid pump piston rod 82 and the air pump piston rod 102. In addition, the annular rim 186 of the seal and lock sleeve 182 of the dispenser head engages against the interior surface of the lower cylindrical portion 200 of the lock collar 198 as shown in FIG. 2. The bottom of the seal and lock sleeve 182 extends into the top opening of the air pump chamber 52 and seals against the first interior surface section 54 of the air pump chamber as also shown in FIG. 2. This seals the air pump chamber 52 against any liquid that would pass through the vent hole 74. This also prevents any liquid that would pass through the vent hole 74 from leaking out of the dispenser 10.

To lock the pump plunger 14 in the pump housing 12 in the sealed positions shown in FIG. 2, the dispenser head is rotated so that the lock tab 188 on the seal and lock sleeve 182 is aligned with the opening 206 in the lock flange 204 of the lock collar 198. The tab 188 is passed through the opening 206 and the dispenser is rotated so that the tab engages against the underside of the lock flange 204 as shown in FIG. 2. This secures the pump plunger 14 in its locked and sealed position relative to the pump housing 12.

Figure 6:
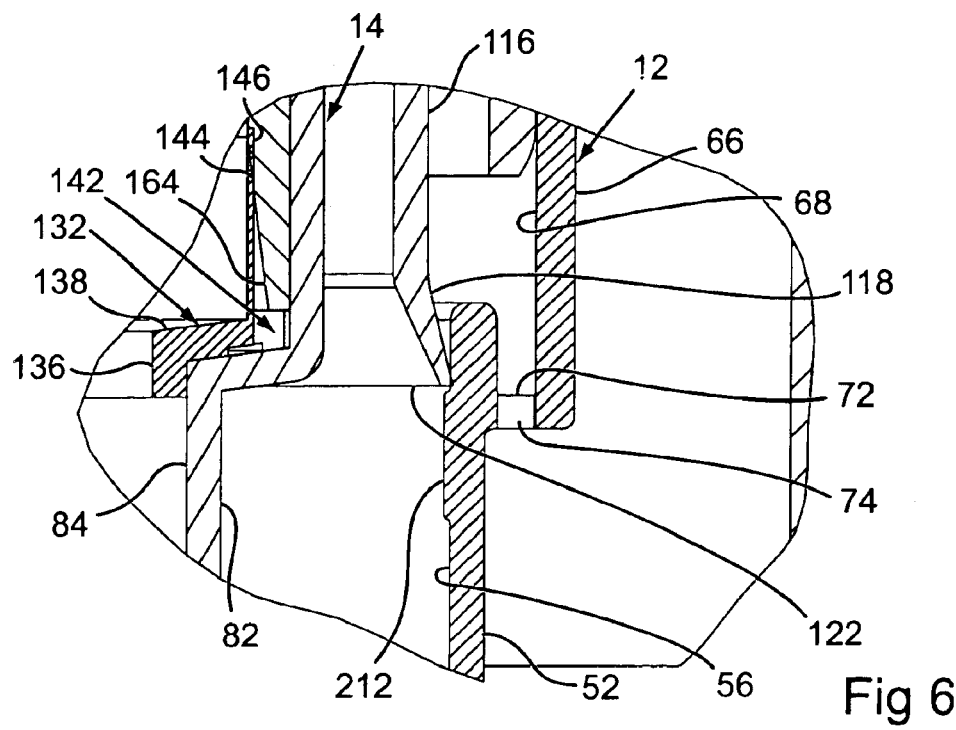
FIG. 6 is a further embodiment of the air pump chamber.

FIG. 6 shows a variant embodiment of the liquid foaming dispenser 10 of the invention. In FIG. 6 the larger interior diameter surface section 54 of the air pump chamber 52 previously described has been replaced by an axially extending rib 212. The other component parts of this variant embodiment of the dispenser remain the same. When the air pump piston 112 moves upwardly in the air pump chamber 52 to the extent that the bottom end 122 of the air pump piston engages with the rib 212, the rib 212 separates the air pump piston bottom end 122 from engagement with the interior surface of the air pump chamber 52 and thereby vents the interior of the air pump chamber to the exterior environment of the dispenser.

Figure 7:
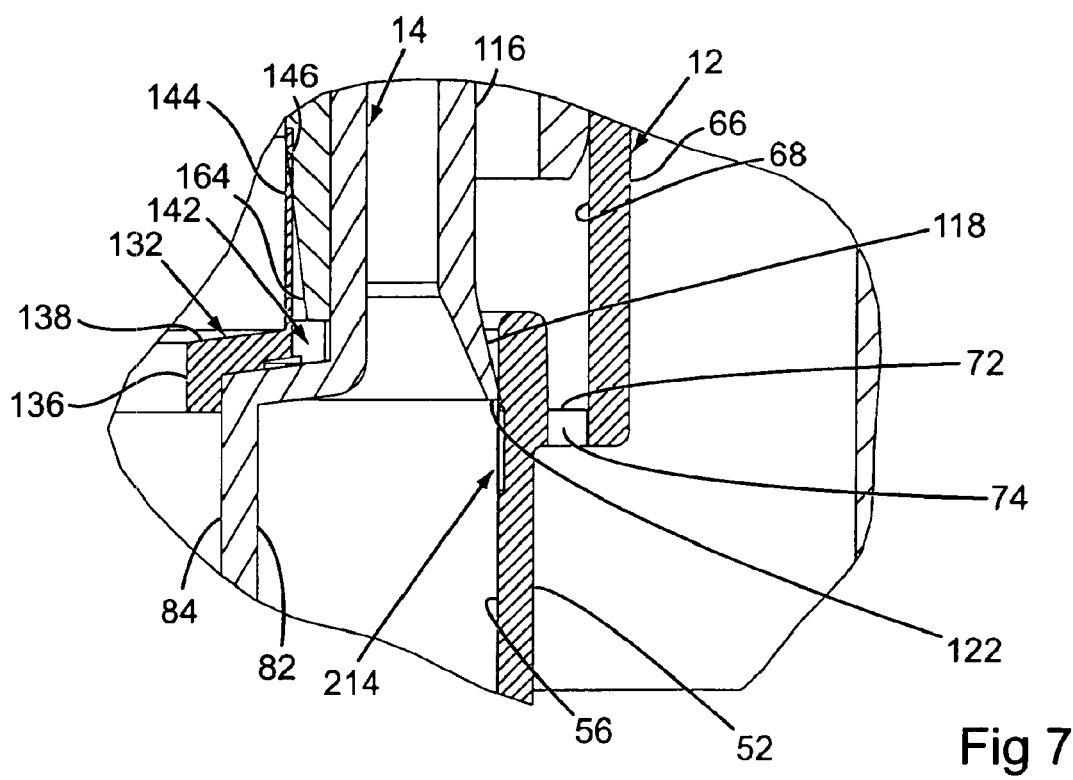
FIG. 7 is a still further embodiment of the air pump chamber.

FIG. 7 shows the detail of a still further embodiment of the liquid foaming dispenser 10. In FIG. 7 the larger first interior diameter surface section 54 of the air pump chamber 52 has been replaced by an axially extending groove 214 in the interior surface of the air pump chamber. All the other component parts of the dispenser 10 remain the same. In this embodiment of the dispenser, when the air pump piston bottom end 122 moves upwardly and is positioned adjacent the axial groove 214, the groove 214 vents the interior of the air pump chamber 52 to the exterior environment of the dispenser 10.

The construction of the liquid foaming dispenser and it's operations described above provide a liquid foaming dispenser that can produce and dispense a thick foam without requiring the additional component parts of prior art dispensers, in particular a valve assembly that controls the supply of air into the air pump chamber.

FIGS. 8–12 show a further embodiment of the liquid foaming dispenser of the invention. This embodiment of the dispenser employs many of the same component parts of the first described dispenser or component parts that are very similar to those of the first described dispenser. Component parts of the embodiment of FIGS. 8–12 that are the same or similar to component parts of the previously described first embodiment are identified by the same reference numbers followed by a prime (prime). Because these component parts of the dispenser embodiment of FIGS. 8–12 are the same or similar to the component parts of the first described dispenser, they will only be described generally. The construction of the dispenser embodiment shown in FIGS. 8–12 differs from that of the previously described embodiments of the dispenser primarily in that three bias closed valves are used in the construction of the embodiment of FIGS. 8–12. By "biased closed" what is meant is that the valves are closed and prevent fluid flow past the valves in their at rest positions. Furthermore, the "biased closed" valves remain in their closed positions when the dispenser is oriented horizontally or when the dispenser is moved to an inverted position. The use of the "biased closed" valves in the construction of the dispenser of FIGS. 8–12 prevents leakage of the contents of a container to which the dispenser is attached should the dispenser and container be oriented horizontally or inverted. The use of the "biased closed" valves also reduces the number of component parts of the dispenser of FIGS. 8–12 from that of the previously described embodiments. In addition, the construction of the embodiment of the dispenser shown in FIGS. 8–12 employs a different system of venting the interior of the container attached to the dispenser and in venting the interior of the air pump chamber.

The liquid foaming dispenser 10' shown in FIGS. 8–12 is basically comprised of a pump housing 12', a pump plunger 14' and a container cap and lock assembly 16'. Apart from the construction of a dispenser head of the dispenser which will be later described, the liquid foaming dispenser 10' is symmetric about a center axis 18' that ascends downwardly through the center of the dispenser and defines mutually perpendicular axial and radial directions.

The pump housing 12' is basically constructed with four cylindrical sections. A bottom tubular section 22' is positioned at the bottom of the pump housing and receives a dip tube 24'. The dip tube 24' is inserted into the liquid container (not shown) with which the dispenser is used. Just above the bottom housing section 22' is a cylindrical liquid pump chamber 26'.

The liquid pump chamber 26' is basically the same in construction as that of the previously described embodiments. However, its construction is different in that the liquid pump chamber bottom wall 32' has a cylindrically shaped recess with a curved bottom surface 222 that functions as a valve seat. Although not shown in the drawing figures, the liquid pump chamber valve seat surface 222 has four apertures that pass through the surface and the liquid pump chamber bottom wall 32' providing fluid communication between the dip tube 24' and the interior of the liquid pump chamber 26'. The apertures give the valve seat surface 222 a +-shape.

A first biased closed valve assembly 224 is positioned in the bottom of the liquid pump chamber 26'. The first valve assembly 224 has a flexible disk valve 226 that seats against the valve seat surface 222 of the liquid pump chamber. The disk valve 226 flexes upwardly as viewed in FIGS. 8 and 9 to permit a flow of liquid from the dip tube 24' to the interior of the pump chamber. The resilience of the disk valve 226 biases the disk valve downwardly against the liquid pump chamber valve seat surface 222 to close the valve in the at rest position of the valve.

Just above the disk valve 226 is a base 228 of the first valve assembly 224. The base 228 has a cylindrical configuration with a plurality of circumferentially spaced projections 232 at the bottom of the base. The projections 232 allow liquid to flow between the projections and across the exterior surface of the base 228 into the interior of the liquid pump chamber 26'.

A metal coil spring 44' is positioned in the liquid pump chamber 26'. The spring 44' engages against the projections 232 holding the first biased closed valve assembly 224 in its position at the bottom of the liquid pump chamber 26' shown in FIGS. 8 and 8.

Thus, the first biased closed valve assembly 224 replaces the ball valve 36, the cage 38 and the sealing stopper 42 of the previously described embodiment of the liquid dispenser. Furthermore, the top of the liquid pump chamber 26' opens into the air pump chamber 52'. The sealing and locking collar 94 of the first embodiment of the dispenser is also eliminated from the embodiment of FIGS. 8 and 9.

Figure 8:
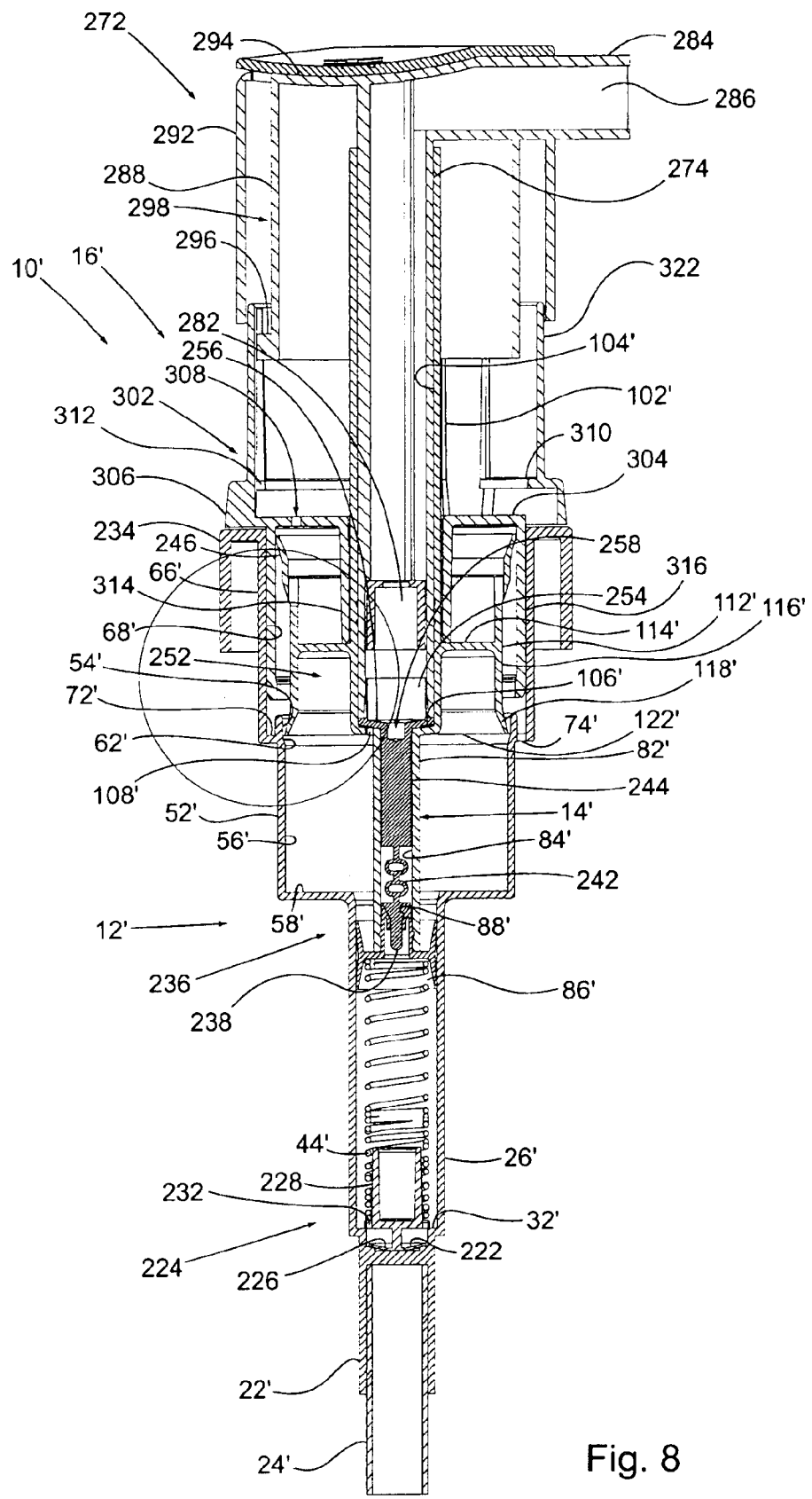
FIG. 8 is a cross-section elevation view of a second embodiment of the liquid foaming dispenser of the invention in the charge position of the dispenser.
Figure 9:
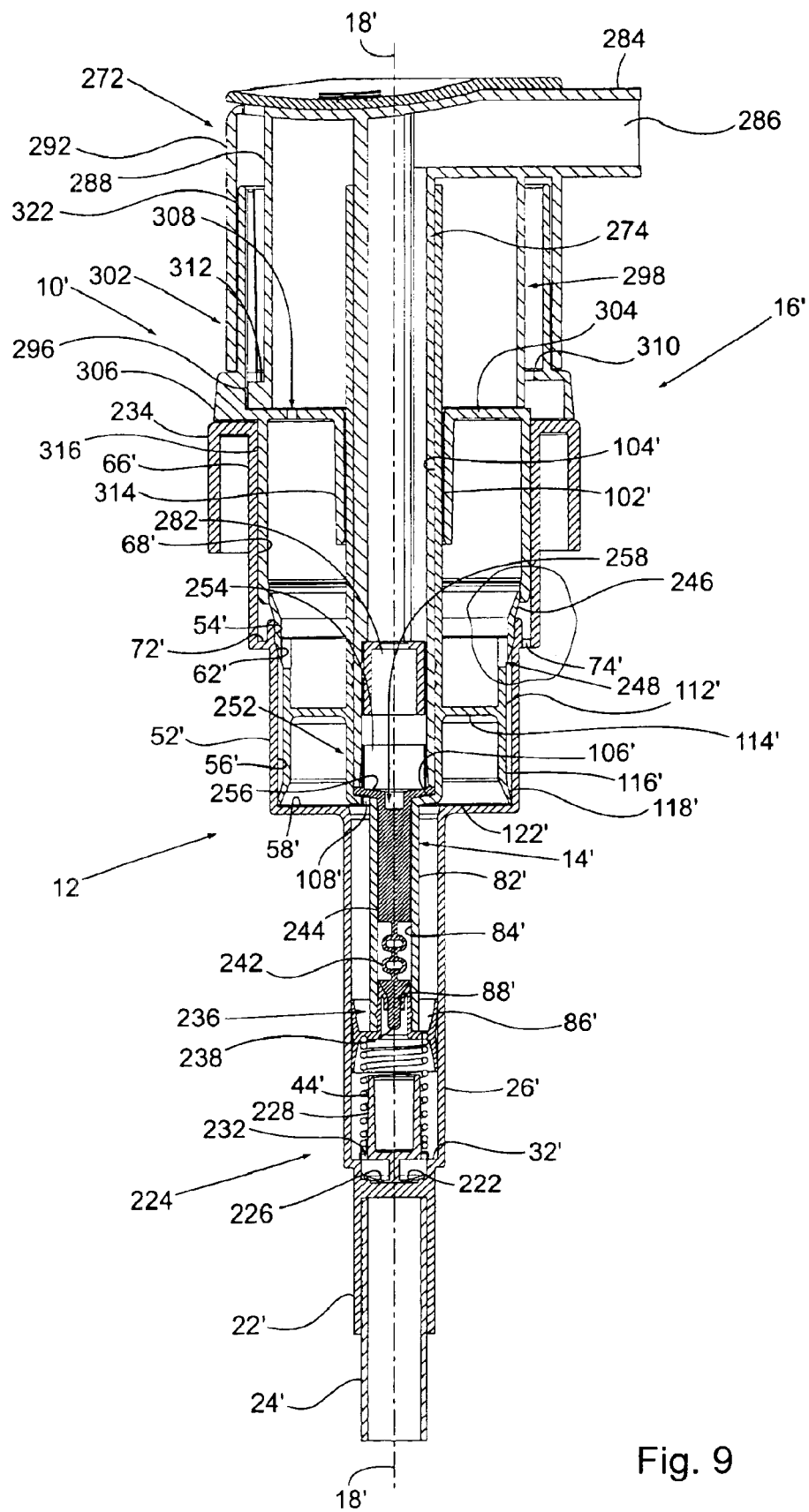
FIG. 9 is a cross-section elevation view of the dispenser of FIG. 8 in the discharge position.

The air pump chamber 52' of the embodiment of the dispenser shown in FIGS. 8 and 9 is constructed in basically the same manner as the first described embodiment. As in the first described embodiment, the air pump chamber 52' has a first interior surface section 54', a second interior surface section 56', a bottom wall 58' and a tapered interior surface section 62'.

The pump housing 12' also comprises a container cap and a lock support cylinder 66'. However, unlike the previously described embodiments, the container cap 234 of the embodiment of FIGS. 8 and 9 is an integral part of the support cylinder 66' and is not a separate component part of the dispenser. With the container cap 234 being an integral part of the lock support cylinder 66', a further separate component part of the previously described embodiments of the dispenser is eliminated. As in the earlier described embodiments, the lock support cylinder 66' extends upwardly from the air pump chamber 52' and has a cylindrical interior surface 68'. The lock support cylinder 66' also has an annular end wall 72' that attaches the lock support cylinder to the exterior of the air pump chamber 52'. A vent hole 74' passes through the annular wall 72' and vents the interior of a liquid container (not shown) to which the dispenser is attached.

The construction of the pump plunger 14' is similar to that of the previously described embodiments in that it is basically comprised of a piston assembly and a dispenser head assembly. The piston assembly comprises a liquid pump piston rod 82' at the bottom of the assembly. The liquid pump piston rod 82' has a cylindrical interior surface 84 that extends through the rod and defines a portion of the liquid discharge passage of the pump plunger 14'. A liquid pump piston 86' is provided at the bottom of the liquid pump piston rod 82'.

The liquid pump piston 68' engages in sliding, sealing engagement with an interior surface of the liquid pump changer. The piston is formed with an integral tubular valve seat 88' that extends upwardly into the interior of the liquid pump piston rod 82'. The tubular valve seat 88' has a generally conical interior seating surface. The engagement of the metal coil spring 44' against the liquid pump piston 86' holds the liquid pump piston and the valve seat 88' in their positions relative to the liquid pump piston rod 82'. This embodiment of the dispenser does not employ the ball valve 92 of the earlier described embodiments. Instead, a second biased closed valve assembly 236 is employed in the interior of the liquid pump piston rod 82'.

The second biased closed valve assembly 236 includes a sealing plug 238 that is urged downwardly by an integral spring 242 against the valve seat surface of the tubular valve seat 88'. A stem 244 of the second valve assembly 236 is integrally connected with the spring 242. The stem 244 has a +-shaped cross section that allows fluid flow along the outside of the stem and through the liquid pump piston rod 82'. Pressurized fluid in the liquid pump chamber 26' acting against the plug 238 will compress the spring 242 against the stem 244 and unseat the plug 238 from the tubular valve seat 88' of the liquid pump piston 86'. The tubular valve seat 88' defines a portion of the liquid discharge passage through the liquid pump piston rod 82' when the plug 238 is unseated from the valve seat 88'. As stated earlier, in the construction of the embodiment of the dispenser shown on FIGS. 8 and 9, the second biased closed valve assembly 236 eliminates the ball valve 92 of the previously described embodiments and also eliminates the annular sealing collar 94 of the previously disclosed embodiments.

Figure 10:
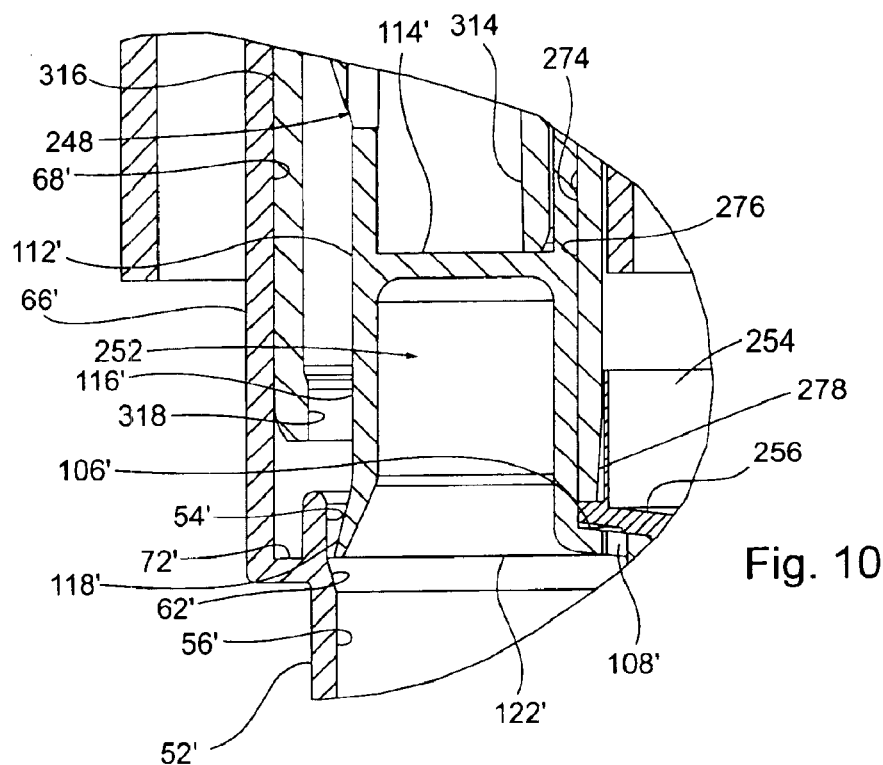
FIG. 10 is a partial enlarged view of the details of the dispenser shown in the circled area to the left in FIG. 8.
Figure 11:
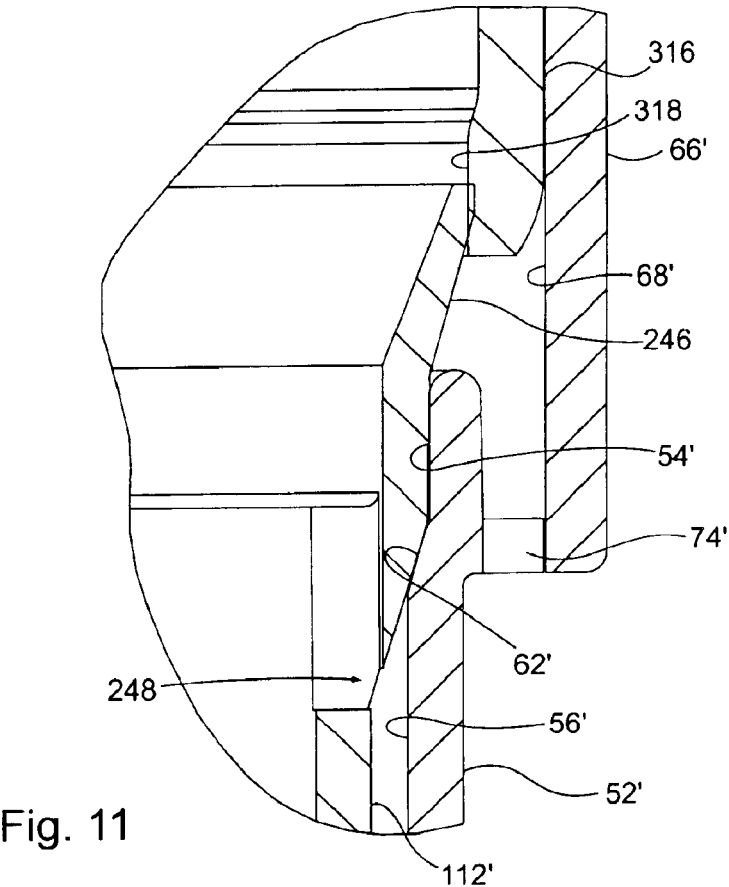
FIG. 11 is a partial enlarged view of the details of the dispenser shown in the circled area to the right in FIG. 9.
Figure 12:
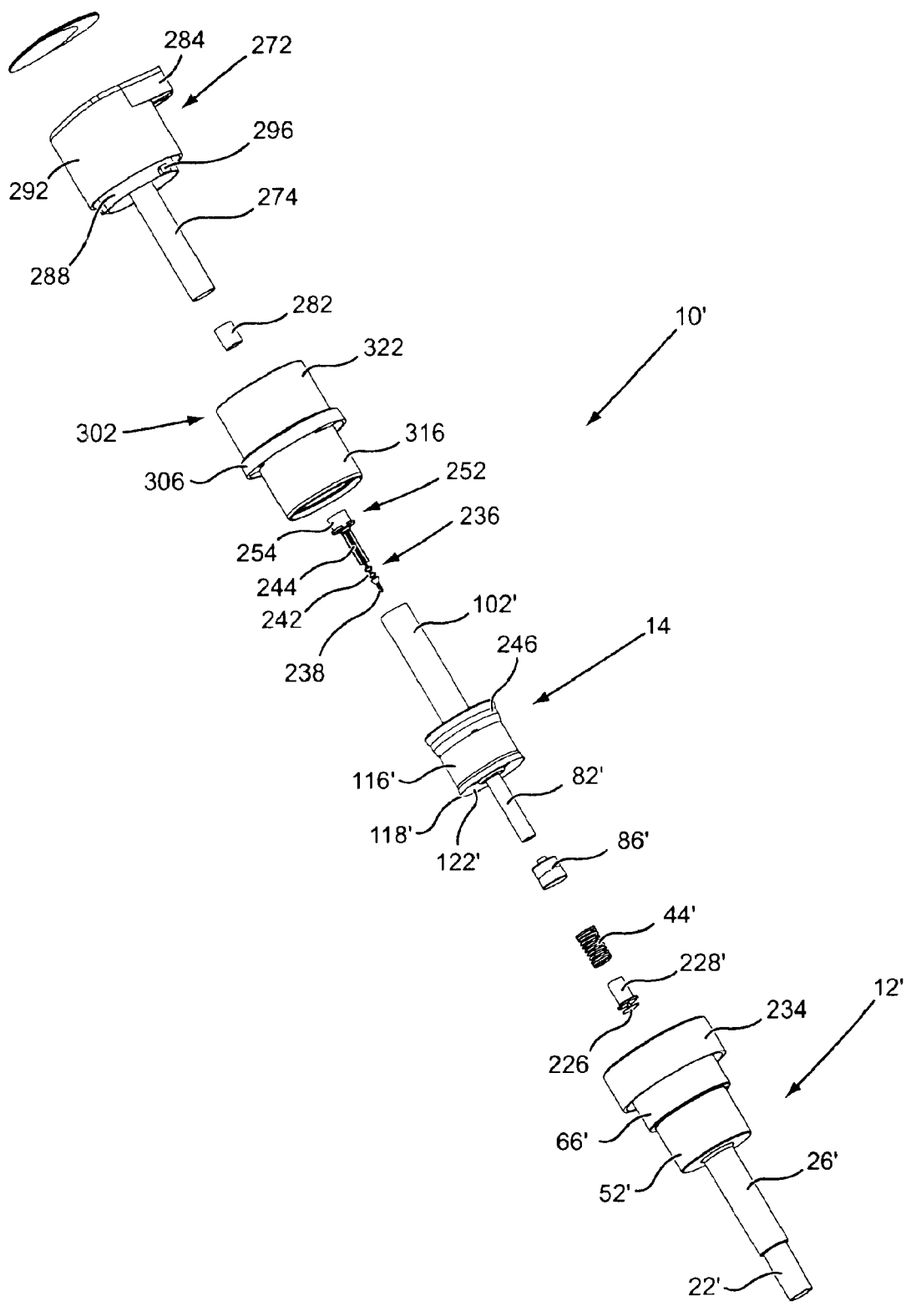
FIG. 12 is a perspective view of the disassembled component parts of the dispenser of FIG. 8.

As in the previously disclosed embodiments, the top of the liquid pump piston rod 82' merges into the bottom of the air pump piston rod 102'. The air pump piston rod 102' also has a cylindrical interior surface 104' that extends through the rod and defines a portion of the liquid discharge passage through the pump plunger. An annular bottom wall 106' joins the air pump piston rod 102' to the liquid pump piston rod 82'. As in the previous embodiments, a pair of diametrically opposed valve openings 108', only one of which is seen in FIGS. 8, 9 and 10, extend through the annular bottom wall 106'.

An air pump piston 112' is connected to the air pump piston rod 102' by an annular wall 114'. As in the previously described embodiments, the air pump piston 112' has an exterior surface with a first surface section 116' and a second surface section 118'. As the air pump piston exterior surface extends downwardly from the first exterior surface section 116' to the second exterior surface section 118', the exterior surface of the second exterior surface section 118' expands radially outwardly. The exterior diameter of the air pump piston exterior surface at the piston bottom end 112' is smaller than the interior diameter of the air pump chamber first interior surface section 54', but larger than the interior diameter of the air pump chamber second interior surface section 56'. Unlike the earlier described embodiments, the air pump piston 112' also extends upwardly from the annular wall 114'. The first exterior surface section 116' of the air pump piston extends upwardly from the annular wall 114' to a third exterior surface section 246 of the air pump piston. As the air pump piston exterior surface extends upwardly from the first exterior surface section 116' to the third exterior surface section 246, the exterior surface of the third exterior surface section 246 expands radially outwardly. A pair of vent holes 248 are provided through diametrically opposite sides of the air pump piston 112' just below the third exterior surface section 246 of the piston. From the air pump piston 112', the air pump piston rod 102' extends upwardly to an open top end 124' of the piston rod.

A third biased closed valve assembly 252 is provided in the dispenser of FIGS. 8 and 9. The third valve assembly includes a tubular check valve 254 that is assembled into the portion of the pump plunger liquid discharge passage defined by the interior surface 104' of the air pump piston rod 102'. The tubular check valve 254 of this embodiment is basically the same in construction as the tubular check valve 132 of the previously described embodiments. The tubular check valve 254 differs from the previously described embodiments in that it is an integral part of the stem 244, spring 242 and plug 238 of the second biased closed valve assembly 236. By the tubular check valve 254, stem 244, spring 242 and plug valve 238 being one piece, the number of component parts of the dispenser of FIGS. 8 and 9 is further reduced from that of the previously described embodiments.

The tubular check valve 254 has an annular bottom wall 256 that extends radially outwardly from the stem 244. A center bore 258 passes through the bottom wall 256. The center bore 258 communicates with the channels of the stem 244 that are defined by the +-shaped cross section of the stem. A pair of diametrically opposed notches (not shown) are formed in the bottom wall 256 in positions that coincide with the valve openings 108' through the bottom wall 106' of the air pump piston rod 102'. The resilient tubular check valve 254 extends upwardly from the bottom wall 256 of the valve. As in the earlier described embodiments, the tubular check valve 254 is positioned radially inside the pair of notches (not shown) and an interior of the tubular valve defines a portion of the liquid discharge passage of the pump plunger.

The dispenser head assembly of the pump plunger 14' includes a dispenser head 272 that has a center tube 274 that is inserted into the air pump piston rod 102' at the top end of the rod. The tube 274 has an exterior surface 276 that engages against the air pump piston rod interior surface 104' securing the dispenser head to the piston rod. The center tube 274 has a cylindrical interior surface 278 that defines a portion of the liquid discharge passage of the pump plunger 14'. The tube interior surface 278 at the lower end of the tube tapers radially outwardly as it extends axially downwardly to the bottom end of the tube 274. This provides a small spacing between the center tube interior surface 278 at the bottom of the tube and the exterior surface of the tubular check valve 254 as shown in FIG. 10. This spacing is accessible through the pair of notches (not shown) of the tubular check valve from the air pump piston rod valve openings 108'.

A fluid disrupter 282 is positioned in the center tube portion 274 of the dispenser head 272. The fluid disrupter 282 has basically the same construction as the fluid disrupter 172 of the previously described embodiments.

The top of the dispenser head 272 is provided with a spout 284 that extends to one side of the head. The spout has an interior surface 286 that defines a portion of the liquid discharge passage extending through the dispenser head. The dispenser head also has a inner cylindrical wall 288 and an outer cylindrical wall 292 that extend downwardly from a top surface of the dispenser head. The inner cylindrical wall has a lock tab 296 that projects radially outwardly from the bottom of the inner wall. The outer cylindrical wall 292 is spaced radially outwardly from the inner cylindrical wall 288 defining an annular cavity 298 between the two walls.

A lock column 302 is mounted on the top of the container cap 234. The lock column 302 has a circular plate 304 at its middle and an annular ring 306 that surrounds the plate and projects upwardly from the plate. A vent hole 308 passes through the plate 304. The vent hole 308 communicates the exterior environment of the dispenser with the interior of the container (not shown) connected to the dispenser through the vent holes 248 in the air pump piston and the vent hole 74' in the pump housing 12'. The annular ring 306 has an inwardly projecting annular lock flange 310 that extends around the interior of the ring at the top of the ring. A notch 312 passes through the lock flange 310. The lock flange 310 is positioned where the dispenser head lock tab 296 can be passed through the notch 312 and rotated to a position beneath the lock column lock flange 310 to hold the dispenser head in its downward position shown in FIG. 9.

The lock column 302 has an inner tubular member 314 that extends downwardly from the lock column plate 304 and extends around the top of the air pump piston rod 124'. The inner tubular member 314 receives the top of the air pump piston rod 124' in sliding engagement enabling the air pump piston rod 124' to reciprocate through the inner tubular member 314.

An outer tubular member 316 of the lock column is spaced radially outwardly from the inner tubular member 314 and extends downwardly from the circular plate 304. The outer tubular member 316 has an exterior surface that engages in a tight fit inside the cap and lock support cylinder 66'. The engagement of the outer tubular member 316 with the cap and lock support cylinder 66' positions the bottom end of the inner tubular member 314 where it will stop the upward movement of the air pump piston 112' by its engagement with the top of the annular wall 114' of the air pump piston. In addition, the inner surface of the outer tubular member 316 engages in a sliding sealing engagement with the air pump piston third exterior surface section 246. The bottom of the outer tubular member interior surface is provided with a radially inwardly projecting section 318. This section 318 of the outer tubular member 316 engages with the air pump piston third exterior surface section 246 when the dispenser head 272 is pushed to its downward position shown in FIG. 9 to seal closed the air vent path through the dispenser and prevent the contents of the container to which the dispenser is attached from leaking from the container through the dispenser if the dispenser and contained should be positioned on their sides or inverted.

The lock column 302 also has a cylindrical sleeve 322 that projects upwardly from the lock column annual ring 306. The sleeve 322 is positioned outside the dispenser head inner cylindrical wall 288 and inside the dispenser head outer cylindrical wall 292. The sleeve 322 telescopes inside the dispenser head outer cylindrical wall 292 as the dispenser head is reciprocated relative to the pump housing, giving the exterior of the dispenser head and the pump housing and aesthetically pleasing appearance.

The operation of the liquid foaming dispenser of FIGS. 8–12 is basically the same as that of the previously described embodiments of the dispenser. With the dispenser attached to a liquid filled container (not shown), and the dispenser head 272 in its down or discharge position relative to the pump housing 12', the dispenser head is first rotated to disengage the lock tab 296 of the dispenser head from the lock flange 310 of the lock column. The compressed spring 44' then causes the dispenser head to be moved upwardly. This in turn causes upward movement of the pump plunger 14' relative to the pump housing 12'. The upward movement of the plunger 14' creates a vacuum in the liquid pump chamber 26' and the air pump chamber 52'. The plug 238 of the second biased closed valve assembly 236 prevents air from being drawn through the discharge passage and into the liquid pump chamber 26' by the vacuum in the liquid pump chamber. The vacuum in the liquid pump chamber 26' causes the disk valve 226 of the first biased closed valve assembly 224 to unseat from the liquid pump chamber valve seat surface 222 and draws liquid through the dip tube 24' into the liquid pump chamber 26'.

The upward movement of the air pump piston 112' in the air pump chamber 52' also creates a vacuum in the air pump chamber. The engagement of the tubular valve 254 of the third biased closed valve assembly 252 against the interior surface 278 of the dispenser head center tube 274 prevents air from entering the air pump chamber 52' from the liquid discharge passage. The upward movement of the air pump piston 112' continues until the piston reaches the first interior surface section 54' of the air pump chamber where the bottom of the air pump piston disengages from the interior surface of the air pump chamber. This vents the air pump chamber 52' to the exterior environment of the dispenser through the vent holes 242 in the piston and the vent hole 308 in the lock column plate 304, causing air to enter into the air pump chamber 52'.

Subsequent downward movement of the pump plunger 14' into the pump housing 12' pressurizes the contents of the air pump chamber 52'. The liquid contained in the liquid pump chamber 26' is compressed and causes the disk valve 226 to seat against the liquid pump chamber valve seat surface 222. Compression of the liquid also causes the plug 238 of the second biased closed valve assembly to move upwardly against the bias of the spring 242 and unseat from the liquid pump piston valve seat 88'. The continued downward movement of the liquid pump piston 86' causes the liquid in the liquid pump chamber 26' to move upwardly through the discharge passage of the dispenser. The air under pressure in the air pump chamber 52' causes the resilient tubular valve 254 of the third biased closed valve assembly 252 to be displaced radially inwardly causing the air to move upward through the vent opening 108' past the valve 254 and into the liquid in the liquid discharge passage. Both the air and the liquid pass through the disrupter 282 in the liquid discharge passage creating a foam that is dispensed from the dispenser head 272.

The construction of the liquid foaming dispenser of FIGS. 8–12 and its operation described above provides a liquid foaming dispenser that can produce and dispense a thick foam without requiring the additional component parts of prior air dispensers, and also provides the dispenser with three biased closed valves that simplify the construction of the dispenser and prevent leakage from a liquid container attached to the dispenser should the dispenser and container be positioned on their sides or be inverted.

Although a preferred embodiment of the dispenser of the invention has been described above, it should be understood that variations and modifications could be made to the dispenser that are intended to be included in the scope of the following claims.

What is claimed is:

1. A foaming liquid dispenser comprising:

a pump housing having a liquid pump chamber and an air pump chamber;

a liquid supply passage communicating with the liquid pump chamber;

a pump plunger mounted in the pump housing for reciprocating movement of the pump plunger relative to the pump housing, the pump plunger having an internal discharge passage extending through the pump plunger;

a liquid pump piston and an air pump piston on the pump plunger, the liquid pump piston and the air pump piston being mounted in the respective liquid pump chamber and the air pump chamber for reciprocating movement between charge and discharge positions of the liquid pump piston and the air pump piston in the respective liquid pump chamber and air pump chamber;

a first biased closed valve between the liquid supply passage and the liquid pump chamber, the first biased closed valve controlling a flow of liquid from the liquid supply passage to the liquid pump chamber and preventing a reverse flow of liquid; and, a second biased closed valve between the liquid pump chamber and the internal discharge passage, the second biased closed valve controlling a flow of liquid from the liquid pump chamber to the internal discharge passage and preventing a reverse flow of liquid.

2. The dispenser of claim 1, further comprising:

a third biased closed valve between the air pump chamber and the internal discharge passage, the third biased closed valve controlling a flow of air from the air pump chamber to the internal discharge passage and preventing a reverse flow of air.

3. The dispenser of claim 2, further comprising:

one of the first, second and third biased closed valves being a flexible disk valve.

4. The dispenser of claim 2, further comprising:

one of the first, second and third biased closed valves being a flexible tube valve.

5. The dispenser of claim 2, further comprising:

one of the first, second and third biased closed valves being a plug with a flexible biasing spring.

6. The dispenser of claim 2, further comprising:

the second and third biased closed valves being positioned in the internal discharge passage.

7. The dispenser of claim 2, further comprising:

the first, second and third biased closed valves being coaxially aligned.

8. The dispenser of claim 2, further comprising:

the liquid pump chamber and the air pump chamber having a common axis and the first, second and third biased closed valves being positioned along the axis of the liquid pump chamber and the air pump chamber.

9. The dispenser of claim 2, further comprising:

the first, second and third biased closed valves including a disk valve, a plug and spring valve, and a tube valve.

10. A foaming liquid dispenser comprising:

a pump housing having a liquid pump chamber and an air pump chamber;

a liquid supply passage communicating with the liquid pump chamber;

a pump plunger mounted in the pump housing for reciprocating movement of the pump plunger relative to the pump housing, the pump plunger having an internal discharge passage extending through the pump plunger;

a liquid pump piston and an air pump piston on the pump plunger, the liquid pump piston and the air pump piston being mounted in the respective liquid pump chamber and the air pump chamber for reciprocating movement between charge and discharge positions of the liquid pump piston and the air pump piston in the respective liquid pump chamber and air pump chamber;

a first biased closed valve between the liquid supply passage and the liquid pump chamber, the first biased closed valve controlling a flow of liquid from the liquid supply passage to the liquid pump chamber and preventing a reverse flow of liquid;

a second biased closed valve between the liquid pump chamber and the internal discharge passage, the second biased closed valve controlling a flow of liquid from the liquid pump chamber to the internal discharge passage and preventing a reverse flow of liquid;

a third biased closed valve between the air pump chamber and the internal discharge passage, the third biased closed valve controlling a flow of air from the air pump chamber to the internal discharge passage and preventing a reverse flow of air; and, the second and third biased dosed valves being connected together as one piece.

11. A foaming liquid dispenser comprising:

a pump housing having a liquid pump chamber and an air pump chamber;

a liquid supply passage communicating with the liquid pump chamber;

a pump plunger mounted in the pump housing for reciprocating movement of the pump plunger relative to the pump housing, the pump plunger having an internal discharge passage extending through the pump plunger;

a liquid pump piston and an air pump piston on the pump plunger, the liquid pump piston and the air pump piston being mounted in the respective liquid pump chamber and the air pump chamber for reciprocating movement between charge and discharge positions of the liquid pump piston and the air pump piston in the respective liquid pump chamber and air pump chamber;

a first biased closed valve between the liquid supply passage and the liquid pump chamber, the first biased closed valve controlling a flow of liquid from the liquid supply passage to the liquid pump chamber and preventing a reverse flow of liquid;

a second biased closed valve between the liquid pump chamber and the internal discharge passage, the second biased closed valve controlling a flow of liquid from the liquid pump chamber to the internal discharge passage and preventing a reverse flow of liquid;

a third biased closed valve between the air pump chamber and the internal discharge passage, the third biased closed valve controlling a flow of air from the air pump chamber to the internal discharge passage and preventing a reverse flow of air;

the second and third biased closed valves being positioned in the internal discharge passage; and, the second and third biased closed valves being connected to opposite ends of a stem positioned in the internal discharge passage.

12. A foaming liquid dispenser comprising:

a pump housing having a liquid pump chamber and an air pump chamber;

a liquid supply passage communicating with the liquid pump chamber;

a pump plunger mounted in the pump housing for reciprocating movement of the pump plunger relative to the pump housing, the pump plunger having an internal discharge passage extending through the pump plunger;

a liquid pump piston and an air pump piston on the pump plunger, the liquid pump piston and the air pump piston being mounted in the respective liquid pump chamber and air pump chamber for reciprocating movement between charge and discharge positions of the liquid pump piston and the air pump piston in the respective liquid pump chamber and air pump chamber;

a first valve between the liquid supply passage and the liquid pump chamber, the first valve controlling a flow of liquid from the liquid supply passage to the liquid pump chamber and preventing a reverse flow;

a second valve between the liquid pump chamber and the internal discharge passage, the second valve controlling a flow of liquid from the liquid pump chamber to the internal discharge passage and preventing a reverse flow;

a third valve between the air pump chamber and the internal discharge passage, the third valve controlling a flow of air from the air pump chamber to the internal discharge passage and preventing a reverse flow; and, at least two of the first, second and third valves being one piece.

13. The dispenser of claim 12, further comprising:

the second and third valves being one piece.

14. The dispenser of claim 13, further comprising:

a stem having a length with opposite ends with one end of the stem being connected to the second valve and an opposite end of the stem being connected to the third valve.

15. The dispenser of claim 14, further compromising:

the stem being position in the internal discharge passage.

16. The dispenser of claim 13, further comprising:

a resilient spring connecting the second and third valves.

17. The dispenser of claim 12, further comprising:

the first, second and third valves being coaxially aligned.

18. The dispenser of claim 12, further comprising:

the liquid pump chamber and the air pump chamber having a common axis and the first, second and third valves being positioned along the axis of the liquid pump chamber and air pump chamber.

19. The dispenser of claim 12, further comprising:

the second and third valves each being a biased closed valve.

20. The dispenser of claim 19, further comprising:

one of the second and third valves being a flexible tube valve.

* * * * *